(12) United States Patent
Herrmann et al.

(10) Patent No.: US 10,315,506 B2
(45) Date of Patent: Jun. 11, 2019

(54) SELECTIVE SHIFT TRANSMISSION INITIAL GEAR DETERMINATION

(71) Applicant: FORD GLOBAL TECHNOLOGIES, LLC, Dearborn, MI (US)

(72) Inventors: Matthew Allan Herrmann, Royal Oak, MI (US); Qing Wang, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 14/105,841

(22) Filed: Dec. 13, 2013

(65) Prior Publication Data
US 2015/0166048 A1    Jun. 18, 2015

(51) Int. Cl.
*B60K 6/445*    (2007.10)
*B60W 10/06*    (2006.01)
(Continued)

(52) U.S. Cl.
CPC ........... *B60K 6/445* (2013.01); *B60W 10/06* (2013.01); *B60W 10/08* (2013.01); *B60W 20/30* (2013.01); *B60W 2520/10* (2013.01); *B60W 2540/10* (2013.01); *B60W 2540/16* (2013.01); *B60W 2710/1005* (2013.01); *F16H 2061/6615* (2013.01); *Y02T 10/6239* (2013.01); *Y02T 10/6286* (2013.01); *Y10S 903/902* (2013.01)

(58) Field of Classification Search
CPC ...... B60W 20/00; B60W 20/30; B60W 10/06; B60W 10/08; B60W 2520/10; B60W 2540/10; B60W 2540/16; B60W 2710/1005; B60K 6/445; F16H 2061/6615; Y02T 10/6239; Y02T 10/6286; Y10S 903/902
USPC ......................................... 701/22; 180/65.265
See application file for complete search history.

(56) References Cited

U.S. PATENT DOCUMENTS 2,599,525 A * 6/1952 Randol ................. B60W 10/02
192/114 R
5,201,250 A * 4/1993 Kato ..................... B60W 10/06
477/109
(Continued)

FOREIGN PATENT DOCUMENTS

JP    2009166516 A    7/2009

OTHER PUBLICATIONS

Chinese Office Action for Chinese Application No. 201410771753.2 dated Jan. 4, 2018.

*Primary Examiner* — Angelina Shudy
(74) *Attorney, Agent, or Firm* — David Kelley; Brooks Kushman P.C.

(57) ABSTRACT

A method of operating a vehicle having a continuously variable transmission to simulate a step-ratio transmission. The method includes increasing an output torque based on a modified accelerator pedal position in response to a corresponding virtual gear selection. An initial virtual gear is determined or selected from a predetermined finite number of available virtual gears based on an accelerator pedal position, a vehicle speed, and whether an upshift or downshift has been requested. The engine speed and engine torque are controlled to meet driver expectations of increased or decreased engine speed or vehicle output torque.

14 Claims, 4 Drawing Sheets

(51) Int. Cl.
  *B60W 10/08*  (2006.01)
  *B60W 20/30*  (2016.01)
  *F16H 61/66*  (2006.01)

(56) References Cited

U.S. PATENT DOCUMENTS

| | | | | |
|---|---|---|---|---|
| 5,941,796 | A * | 8/1999 | Lee | F16H 61/0437 477/144 |
| 5,961,420 | A * | 10/1999 | Darnell | F16H 61/0213 477/115 |
| 6,086,506 | A | 7/2000 | Petersmann et al. | |
| 6,157,886 | A * | 12/2000 | Janecke | F16H 61/0213 477/108 |
| 6,634,450 | B1 * | 10/2003 | Fukumura | B60K 28/16 180/197 |
| 7,247,127 | B2 * | 7/2007 | Popp | F16H 61/10 477/121 |
| 7,618,343 | B2 | 11/2009 | Tabata et al. | |
| 7,678,005 | B2 | 3/2010 | Tuckfield | |
| 7,921,943 | B2 * | 4/2011 | Ueoka et al. | 180/65.21 |
| 8,226,507 | B2 | 7/2012 | Uchiyama | |
| 8,998,770 | B2 * | 4/2015 | Wang | B60W 20/30 477/3 |
| 9,399,455 | B2 * | 7/2016 | Sugitani | B60K 6/48 |
| 9,481,331 | B1 * | 11/2016 | Tucker | B60R 16/0231 |
| 9,637,109 | B1 * | 5/2017 | Johri | B60W 10/06 |
| 9,862,384 | B2 * | 1/2018 | Jiang | B60W 30/18 |
| 9,932,039 | B2 * | 4/2018 | Iketomi | B60W 10/111 |
| 9,945,475 | B1 * | 4/2018 | Diakiw | F16H 61/0213 |
| 2002/0035010 | A1 * | 3/2002 | Kobayashi | B60W 10/02 477/54 |
| 2005/0101435 | A1 * | 5/2005 | Cowan | B60W 30/18 477/83 |
| 2005/0107935 | A1 * | 5/2005 | Herbster | F16H 59/18 701/51 |
| 2005/0209760 | A1 * | 9/2005 | Tabata et al. | 701/53 |
| 2005/0250618 | A1 * | 11/2005 | Colvin | F16D 48/066 477/174 |
| 2006/0155453 | A1 * | 7/2006 | Han | F16H 61/0213 701/54 |
| 2006/0231306 | A1 * | 10/2006 | Severinsky et al. | 180/65.2 |
| 2007/0192018 | A1 * | 8/2007 | Gibson | F02D 13/04 701/110 |
| 2008/0146407 | A1 * | 6/2008 | Tuckfield | 477/34 |
| 2008/0147284 | A1 * | 6/2008 | Tuckfield et al. | 701/56 |
| 2011/0034298 | A1 * | 2/2011 | Doering | F02D 41/0002 477/54 |
| 2011/0202222 | A1 * | 8/2011 | Yamamoto | B60K 6/365 701/22 |
| 2013/0158838 | A1 * | 6/2013 | Yorke | B60W 10/06 701/103 |
| 2013/0196816 | A1 * | 8/2013 | Natsume | B60K 6/48 477/3 |
| 2013/0210575 | A1 * | 8/2013 | Kumazaki | B60K 6/48 477/20 |
| 2014/0004994 | A1 * | 1/2014 | Wang | B60K 6/445 477/4 |
| 2014/0005866 | A1 * | 1/2014 | Kuang | B60W 10/06 701/22 |
| 2014/0005867 | A1 * | 1/2014 | Wang | B60W 20/10 701/22 |
| 2014/0005868 | A1 * | 1/2014 | Wang | B60W 20/30 701/22 |
| 2014/0121058 | A1 * | 5/2014 | Nackers et al. | 477/43 |
| 2014/0121917 | A1 * | 5/2014 | Davis et al. | 701/54 |
| 2014/0121918 | A1 * | 5/2014 | Davis et al. | 701/55 |
| 2014/0336858 | A1 * | 11/2014 | Matsushima | B62M 11/06 701/22 |
| 2014/0350766 | A1 * | 11/2014 | Wang et al. | 701/22 |
| 2014/0352669 | A1 * | 12/2014 | Cunningham | F02D 41/006 123/559.1 |
| 2014/0373668 | A1 * | 12/2014 | Maruyama | G05G 1/30 74/513 |
| 2015/0057866 | A1 * | 2/2015 | Tseng | B60W 30/19 701/22 |
| 2015/0066316 | A1 * | 3/2015 | Fujii | F16H 61/0213 701/51 |
| 2015/0175155 | A1 * | 6/2015 | Nakanishi | B60W 10/02 477/181 |
| 2016/0068161 | A1 * | 3/2016 | Iketomi | B60W 10/111 477/3 |
| 2017/0225683 | A1 * | 8/2017 | Jiang | B60W 30/18 |
| 2017/0307069 | A1 * | 10/2017 | Riera | F16H 59/0204 |
| 2018/0072304 | A1 * | 3/2018 | Cyr | F02D 13/0269 |

* cited by examiner

SELECTIVE SHIFT TRANSMISSION INITIAL GEAR DETERMINATION

TECHNICAL FIELD

The present disclosure relates to a method and system for controlling and operating a vehicle having a continuously variable transmission in a select shift mode to simulate a vehicle having a step-ratio transmission.

BACKGROUND

For vehicles employing a step-ratio or discrete ratio transmission, the transmission input shaft is constrained to be proportional to the vehicle speed with a finite set of gear ratios, except during the brief interval while the transmission is shifting from one ratio to another. As the vehicle is operated, a controller selects the appropriate gear ratio and a command is sent to the transmission to shift to a different one of the finite gear ratios. This shifting between finite gear ratios generally results in engine speed changes and provides different torque multiplication at the vehicle wheels but may also result in "shift shock" as the transmission changes gear ratios.

Hybrid electric vehicles commonly utilize electronic continuously variable transmissions that do not impose a finite set of gear ratios between the transmission input shaft and transmission output shaft. The hybrid electric vehicle is operated by a controller that chooses an exact gear ratio along a variable continuum without gear changes and the associated "shift shock." Additionally, various powertrain configurations do not mechanically impose a strict relationship between the engine speed and the vehicle speed so that engine speed may be controlled independently of the vehicle speed and transmission gear ratio.

For vehicles equipped with an automatic transmission, selection of the gear ratio or engine speed is ordinarily determined by a controller based on current vehicle and ambient operating conditions. Some drivers may prefer to control gear ratio selection and override the controller. Such vehicles may be equipped with driver interface features which permit the driver to signal a desire for a higher or a lower gear ratio relative to the gear ratio automatically selected by the vehicle controller to operate the transmission similar to a manual transmission, but still subject to various limits imposed by the controller to prevent engine overspeed or stall, for example. In a step-ratio automatic transmission, the controller shifts the transmission to one of a plurality of discrete gear ratios, which adjust engine speed accordingly and provide associated torque multiplication at the vehicle wheels. In vehicles equipped with a continuously variable transmission or similar gearbox, the response to a driver initiated shift command is more complicated because the transmission does not inherently provide discrete gear ratios with associated different torque multiplications. Therefore, the discrete gear ratios may be simulated and are sometimes referred to as virtual gears or gear ratios.

When transitioning from a continuously-variable mode to a manual or override mode, the initial discrete virtual gear ratio must be determined or selected. Because the virtual gear ratios are not constrained by traditional engine to vehicle speed ratios, the controller often has more than one suitable initial virtual gear selection based on current vehicle and ambient operating conditions and operator input, such as accelerator pedal position, gear selector position, paddle shifters, etc. However, driver expectations of vehicle behavior are generally different for an upshift compared to a downshift.

SUMMARY

In various embodiments, a method of operating a hybrid-electric vehicle having an engine, a traction battery, a traction motor, a generator and a continuously-variable transmission includes receiving at least one of a user-initiated upshift request and downshift request and a select mode request to simulate operation of a step-ratio transmission, outputting for display a virtual gear selected in response to an accelerator pedal position and a current vehicle speed, and varying an output torque in response to the virtual gear selected, a modified accelerator pedal position, and at least one of the user-initiated upshift request and downshift request by controlling relative speed between an engine speed, a traction motor speed, and a generator speed to meet driver expectations of increased or decreased engine speed and vehicle output torque.

In one embodiment, a method of operating a vehicle having a continuously-variable transmission in a step-ratio transmission operating mode includes increasing an output torque based on a modified pedal position in response to a corresponding virtual gear selection, wherein the corresponding virtual gear selection is based on a pedal position and a downshift request. The method further includes operating at least one of an engine and an electric machine to satisfy the increasing output torque.

A hybrid-electric vehicle is provided with at least one controller in communication with a continuously-variable transmission, an accelerator pedal and a selector device. The controller is configured to display a virtual gear selected in response to an accelerator pedal position and at least one of a user-initiated manual shift mode request, upshift request, and downshift request. The controller is further configured to vary a transmission output torque in response to the virtual gear selected and a modified accelerator pedal position.

Embodiments according to the present disclosure may also include a hybrid powertrain controller. The controller may send control signals to an engine and at least one traction motor. The controller responds to signals from a selector device, an upshift selector, a downshift selector, and an accelerator pedal. The controller may operate in a first Continuously Variable mode when the selector device indicates an automatic driving mode. The controller may transition from the first mode to a second Select Shift mode as the selector device indicates a manually operated shift mode. The controller simulates the operation of a step-ratio or discrete ratio transmission by controlling the engine and traction motor output speed and torque. In some embodiments, the controller transitions from the Continuously Variable Mode to the Select Shift Mode when the upshift or downshift selectors are operated.

Embodiments according to the present disclosure may also include a vehicle having a transmission with a planetary gear set wherein elements of the planetary gear set are driveably connected to an engine, a first electric machine, and vehicle wheels, a second electric machine driveably connected to the vehicle wheels and the planetary gear set, and a controller in communication with the engine, the electric machines, an accelerator pedal, an upshift selector, and a downshift selector. The controller may be programmed to operate the engine and the first and second electric machines in a continuously variable mode, operate the engine and the first and second electric machines in a discrete ratio mode, and transition from the continuously variable mode to the discrete ratio mode in response to operation of the downshift selector. The controller may respond to operation of the upshift or downshift selectors by decreasing or increasing a powertrain output torque, respectively.

Various embodiments according to the present disclosure may provide one or more advantages. For example, systems and methods for controlling a hybrid vehicle according to the present disclosure mimic or emulate a manual or select shift mode of an automatic step-ratio transmission in a hybrid electric vehicle having a continuously variable transmission or similar gearbox, such as a power-split transmission. In addition, various strategies of the present disclosure provide drivers of hybrid vehicles more interactive controls to manually command output torque and acceleration to provide enhanced luxury features and/or a sporty feel. Initial virtual gear selection when transitioning from an automatic mode to a manually activated shift mode according to embodiments of the present disclosure selects a virtual gear and controls the engine and electric machines to provide a change in vehicle operation consistent with driver expectations, i.e. a noticeable increase in engine speed and output torque in response to a downshift request. As such, if a first initial virtual gear is very close to the current input/output speed ratio when transitioning between operating modes, a second initial virtual gear is select so that the resulting vehicle operation will respond in a manner noticeable to the driver.

The above advantages and other advantages and features may be readily apparent from the following detailed description of the preferred embodiments when taken in connection with the accompanying drawings.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
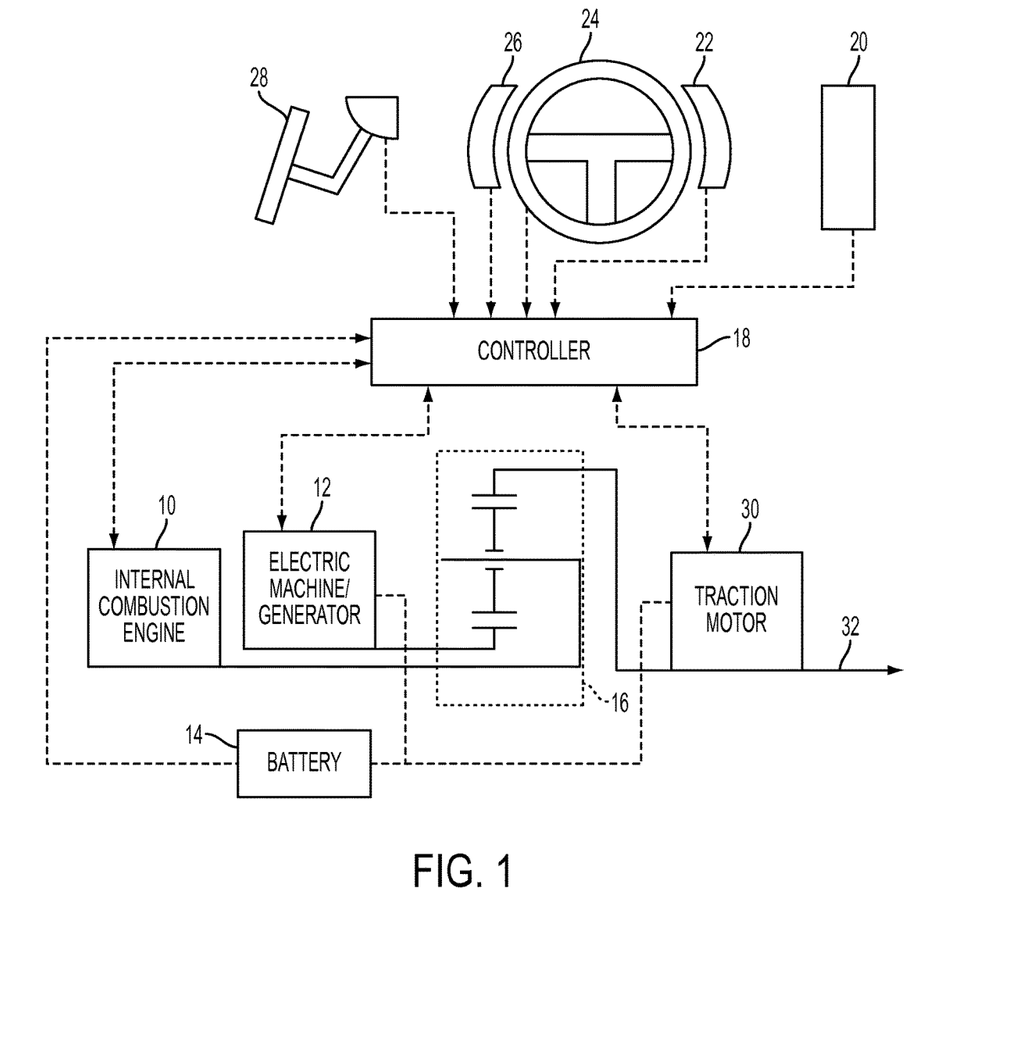
FIG. 1 is a schematic of a hybrid electric vehicle having a manually operable or select shift mode with initial virtual gear selection to provide a noticeable change in vehicle response according to embodiments of the present disclosure.

A representative hybrid electric vehicle having initial virtual gear selection according to various embodiments is illustrated schematically in FIG. 1. The vehicle includes an internal combustion engine 10 driveably connected to an electric machine 12, gearset 16 and output shaft 32. Elements are driveably connected when there is a mechanical power flow path between them such that the speeds of the elements are constrained to be substantially proportional. The output shaft 32 may drive the vehicle wheels directly or indirectly, such as via a differential assembly, for example.

The electric machine 12 and traction motor 30 are both electrically connected to traction battery 14. The traction motor 30 is driveably connected to the output shaft 32. Both the electric machine 12 and the traction motor 30 are reversible electric machines that are capable of converting electrical power into rotational mechanical power or converting rotational mechanical power into electrical power. The terms generator and motor should be regarded merely as labels for ease of description and do not limit the function or operation of either electrical machine.

The speed of the engine 10 may not be constrained to be proportional to the speed of the output shaft 32 in this arrangement. Engine speed may be selected or controlled independently of vehicle speed by setting the associated electric machine speed accordingly. Power may flow from the engine 10 to the output shaft 32 through a combination of mechanical power transfers and electrical power transfers. During some operating conditions, the engine 10 may generate more power than is delivered to the output shaft 32 with the difference, neglecting efficiency losses, delivered to the traction battery 14. Under other operating conditions, the traction battery 14 in combination with electric machine 12 and/or traction motor 30 may supplement the power delivered by the engine 10 such that more power is delivered to the output shaft 32.

The controller 18 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU of controller 18. As generally illustrated in the representative embodiment of FIG. 1, the controller 18 may communicate with the engine 10, the electric machine 12, the traction battery 14, the gearset 16 and the traction motor 30. The controller accepts input signals indicating driver intention from a selector device 20, a downshift selector 22, an upshift selector 26, a steering wheel 24 and an accelerator pedal 28. The selector device 20 may allow the driver to select Park, Reverse, Neutral, Drive, Sport or Low driving modes, for example. The selector device 20 may also be configured to permit a driver to select an upshift or downshift when in the Select Shift Transmission/Sport Driving mode. The downshift and upshift selectors, 22 and 26, may be configured as paddle shifters or a separate portion of the selector device provided with a symbol indicative of a downshift and/or upshift. Such as, "−" or "v" indicating a downshift and "+" or "Λ" indicating an upshift. Alternatively, a separate mode selector switch, button, or similar device may be used to transition between a manual and automatic shift mode.

The controller 18 includes control logic to control the operating speed and torque of engine 10 and traction motor 12 in response to various inputs. The controller 18 interprets driver requests based on several vehicle inputs. These inputs may include, for example, vehicle gear selection (PRNDSL), select-shift, accelerator pedal inputs, battery temperature, voltage, current, and battery state of charge (SOC).

A driver of the vehicle may provide input via accelerator pedal 28 for a demanded powertrain output torque or power for the vehicle. In general, depressing or releasing the accelerator pedal 28 generates an accelerator pedal input signal that may be interpreted by the controller 18 as a demand for increased power or decreased power, or a demand for increased output torque or decreased output torque. Based at least upon input from the accelerator pedal 28, the controller 18 may control the speed and torque of the engine 10 and/or the electric machine 30 to satisfy the torque or power demanded by the driver. In one embodiment, controller 18 operates the vehicle in a step-ratio transmission operating mode by increasing an output torque based on a modified pedal position signal in response to a corresponding virtual gear selection, where the corresponding virtual gear is based on a pedal position signal and a downshift request signal, and operates the engine 10 and/or the electric machine 30 to satisfy the output torque.

The representative embodiment of a hybrid vehicle as illustrated in FIG. 1 may be referred to as a powersplit configuration with the engine 10, traction motor 12, and electric machine 14 driveably connected to the vehicle wheels by planetary gearset 16. As such, the controller 18 may control electric machine 14 to provide a continuously variable input/output ratio for the powertrain. As used throughout this disclosure, references to a continuously variable transmission or powertrain include vehicle configurations similar to the powersplit configuration schematically illustrated in FIG. 1 in addition to any other type of powertrain arrangement where the powertrain is capable of providing a continuously variable input/output speed and/or torque ratio and is not limited to a predetermined number of discrete gear ratios such as provided in a conventional gear-change or speed-change step-ratio transmission. In various embodiments according to the present disclosure, a vehicle having a continuously variable transmission is operated to simulate the feel of a conventional step-ratio transmission by providing a finite number of virtual gear ratios and controlling the relative speeds and/or torques of the engine 10, electric machine 12, and traction motor 30. The controller 18 may be further configured to output for display to the driver, a selected virtual gear while operating in the select shift mode.

While illustrated as a single controller, the controller 18 may be part of a larger control system and may communicate with and/or be influenced by various other controllers throughout the vehicle, such as a vehicle system controller (VSC). Examples of such other controllers that may be communicate with the controller 18 include a brake system control module (BSCM), a high voltage battery controller (BECM), as well as other controllers responsible for various vehicle functions or subsystems. One or more controllers are collectively referred to as a "controller" that commands various actuators in response to signals from various sensors.

The controller 18 response may serve to dictate or influence a number of vehicle functions such as starting/stopping engine 10, operating the electric machine 12 to control the engine speed relative to the vehicle speed and/or recharge the traction battery 14, etc. The controller 18 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

As those of ordinary skill in the art may understand, the devices or functions represented by the flow chart blocks may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, or omitted, although not explicitly illustrated. In one embodiment, the functions illustrated are primarily implemented by software, instructions, or code stored in a non-transitory or persistent computer readable storage medium and executed by a microprocessor-based computer or controller, such as represented by controller 18 (FIG. 1), to control operation of the vehicle.

An algorithm is provided to determine the virtual gear (or gear ratio) to place the vehicle in when a driver first enters a manually activated shift mode, generally referred to as a select shift transmission (SST) mode throughout this disclosure. As described in greater detail below, the virtual gear may be selected to provide vehicle operation consistent with driver expectations, which may vary based on driver input. For example, a driver requesting an upshift will generally expect engine speed and torque to decrease whereas a driver requesting a downshift will generally expect engine speed and torque to increase. If the initial virtual gear selected by the controller is the closest virtual gear associated with current vehicle operating conditions (such as implemented in various prior art strategies), the resulting change in engine speed or output torque may not be noticed by the driver. As such, embodiments according to the present disclosure may select an initial virtual gear and compare the resulting difference between one or more vehicle operating conditions before and after the transition to a threshold, and select a second or different initial virtual gear to provide a more noticeable change in engine speed and/or vehicle output torque than would otherwise be provided by the initial virtual gear selection. Similarly, embodiments according to the present disclosure may select a different initial virtual gear based on whether an upshift or downshift has been requested.

Figure 2:
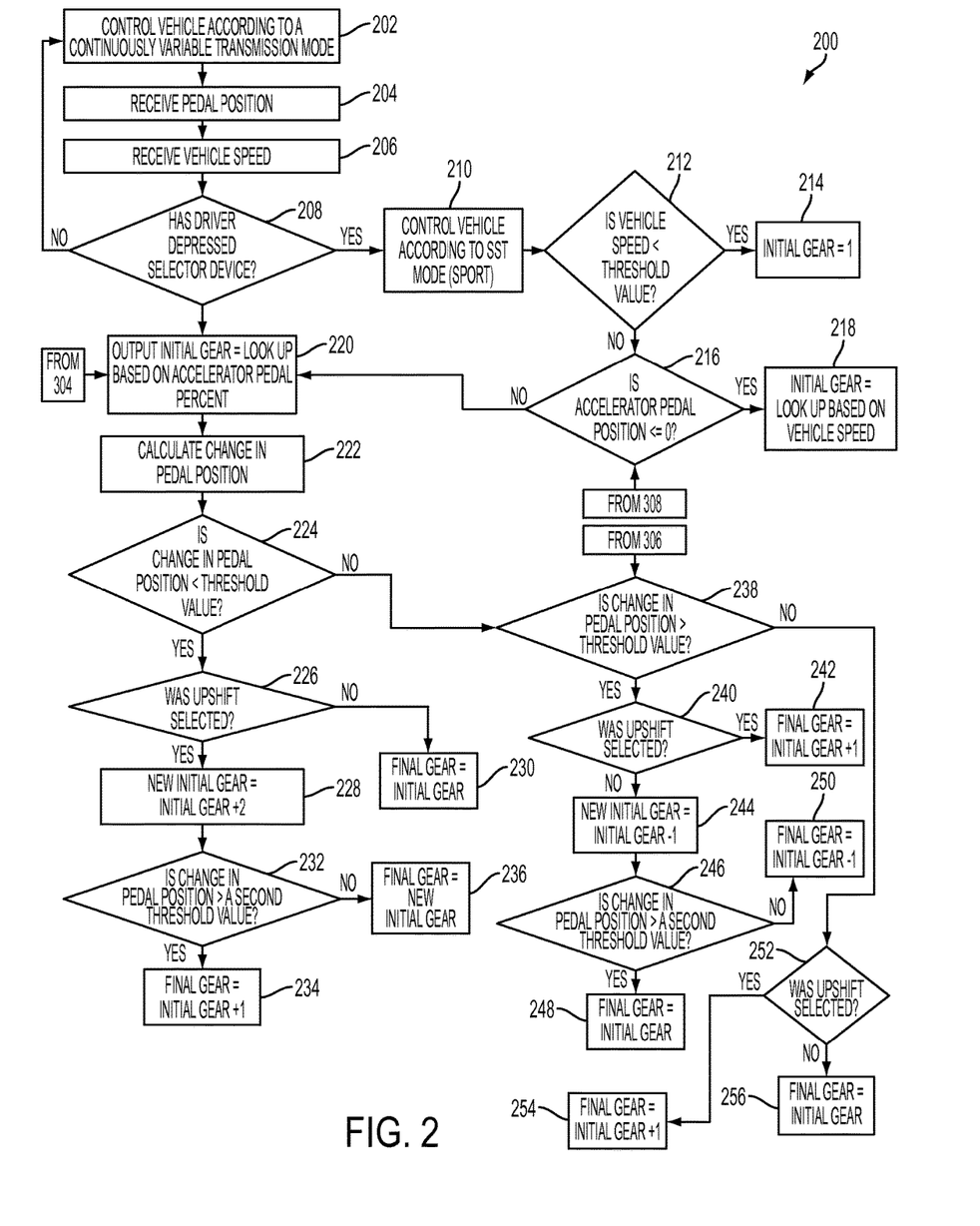
FIGS. 2 and 3 are flow charts illustrating operation of a method for controlling a hybrid vehicle according to embodiments of the present disclosure.

FIG. 2 depicts operation of a system or method 200 representative of an embodiment of the virtual gear selection logic of the controller in SST mode. The controller may initially control the vehicle according to a continuously variable transmission (CVT) mode, step 202, if the vehicle selector device is placed in the Drive (D) position, for example. The virtual gear selection logic may receive as inputs the accelerator pedal position 204 and the current vehicle speed 206 in both CVT mode and SST mode. The vehicle speed may be calculated from traction motor speed or wheel speed sensors, for example.

In the CVT mode, the engine speed and/or electric machine speed may be varied continuously to vary or control the transmission output torque, in response to changes in accelerator pedal position. The controller may be provided with a look-up table or pedal map containing a correlation between accelerator pedal position and vehicle output torque as generally represented by the diagram illustrated in FIG. 4. The operating parameters of the engine, electric machine, and traction motor are changed to achieve the desired or target output torque at the vehicle wheels.

When the engine is running, a target or optimum gear ratio is selected by the controller for a given engine speed, load, and throttle position to minimize fuel consumption while delivering the desired output torque and maintaining the battery at a desired state of charge.

As the driver actuates the downshift or upshift selector or places the selector device in Sport (S) mode, step 208, the controller may transition the vehicle from CVT mode to a Select Shift Transmission (SST) mode, step 210. In SST mode, a target output torque and/or target engine speed are set to simulate a discrete-ratio or step-ratio transmission based on a virtual gear ratio or virtual gear states. The driver may adjust the target wheel torque by traversing the available virtual gears using the downshift or upshift selector. Drivers may expect the hybrid vehicle to behave or react similarly to a conventional vehicle when performing a downshift (i.e. engine speed increases with increased wheel torque) or upshift (i.e. engine speed decreases along with wheel torque). Embodiments according to the present disclosure achieve this effect by appropriate selection of a virtual gear ratio or virtual gear state (or gear number, also referred to as a virtual gear) in response to a manually initiated upshift or downshift command as explained in greater detail below.

The controller may keep the vehicle in SST mode until the driver indicates a desire to leave this mode by either holding the downshift or upshift selector for several seconds or by moving the selector device back to the Drive (D) position. Upon the start of SST mode, the controller may determine a virtual gear based on at least one of vehicle speed, accelerator pedal position, and/or change in accelerator pedal position. The selection of a virtual gear may correspond to a modified accelerator pedal position signal or value that adjusts the target output torque before controlling the engine and/or electric machine. This modified pedal position signal or value permits the vehicle to simulate the feel of a step ratio transmission using the correlation between pedal position and output torque.

In selecting an initial virtual gear, the controller may evaluate vehicle speed and compare the vehicle speed to a threshold value, step 212. If the vehicle speed is less than a threshold value, the controller may output a predetermined initial virtual gear, step 214. For example, this may be implemented by a look up table having a virtual gear of "one" or "first" for vehicle speeds below 10 mph. The controller may output the initial virtual gear of "one" or "first" for display to the driver via an associated instrument panel or other display device.

If the vehicle speed exceeds the threshold value in step 212, the controller may determine if the accelerator pedal position is less than or equal to zero, step 216. An accelerator pedal position less than or equal to zero or another calibrateable value, may indicate an accelerator pedal tip-out (release of the accelerator pedal). If the accelerator pedal position is less than or equal to zero, the controller may output an initial virtual gear based on vehicle speed, step 218. An exemplary look-up table providing a correlation between vehicle speed and virtual gear may appear as follows:

Vehicle Speed=[0-9. 10-19, 20-29, 30-39, 40-49, 50+]
Virtual Gear=[1, 2, 3, 4, 5, 6]

If the accelerator pedal position indicates an accelerator pedal tip-in (accelerator pedal position increasing and greater than zero), the controller may determine the initial virtual gear based on accelerator pedal percentage, step 220, and calculate a change in accelerator pedal position, step 222, to map to a virtual gear. In calculating the change in accelerator pedal position in step 222, the controller compares a previous accelerator pedal position to the current accelerator pedal position over a sampling period. This discrete sampling of the accelerator pedal position permits the controller to determine whether an accelerator pedal tip-in, tip-out or constant position is occurring.

The controller may compare a change in accelerator pedal position to a threshold value. If the change in accelerator pedal position does not exceed a threshold value, step 224, the controller determines whether the driver commanded an upshift, step 226. If the driver has not commanded an upshift, the controller may output a final virtual gear that is equal to the initial virtual gear selected based on vehicle speed, step 230. However, if the driver commanded an upshift in step 226, the controller may select a final virtual gear higher than the initial virtual gear, step 228. For example, the final virtual gear may be two virtual gears higher than the initial virtual gear; e.g. final virtual gear=3, initial virtual gear=1.

The controller may then compare the change in accelerator pedal position to a check value or second threshold, step 232. If the change in accelerator pedal position exceeds the check value, the controller may limit the final virtual gear output to be less than the selected final virtual gear from step 222, in step 226; e.g. final virtual gear=2, instead of 3. Should the change in pedal position not exceed a check value, the controller continues to output the final virtual gear from step 228, step 236.

Referring back to step 224, should the change in accelerator pedal position exceed a threshold value, step 238, the controller may determine if the driver commanded a downshift or upshift in step 240. If the driver commanded an upshift, the controller selects a final virtual gear greater than the initial virtual gear, step 242. For example, the final virtual gear may be only one virtual gear higher than the initial gear state. However, if the driver did not command an upshift in step 240, but commanded a downshift, the controller selects a final virtual gear less than the initial gear, step 244. The controller may then compare the change in accelerator pedal position to a check value, step 246. If the change in accelerator pedal position does not exceed the check value, the controller may output the final virtual gear from step 244, step 250. Should the change in accelerator pedal position exceed the check value in step 246, the controller may limit the final virtual gear selection and apply the initial virtual gear, step 248.

Referring back to step 238, if the change in accelerator pedal position does not exceed a threshold value, the controller may determine whether the driver commanded a downshift or upshift, step 252. If a downshift was commanded by the driver, the controller may output a final virtual gear equal to the initial virtual gear, step 256. However, if the driver commanded an upshift, the controller may output a final virtual gear greater than the initial gear state, step 254.

Figure 3:
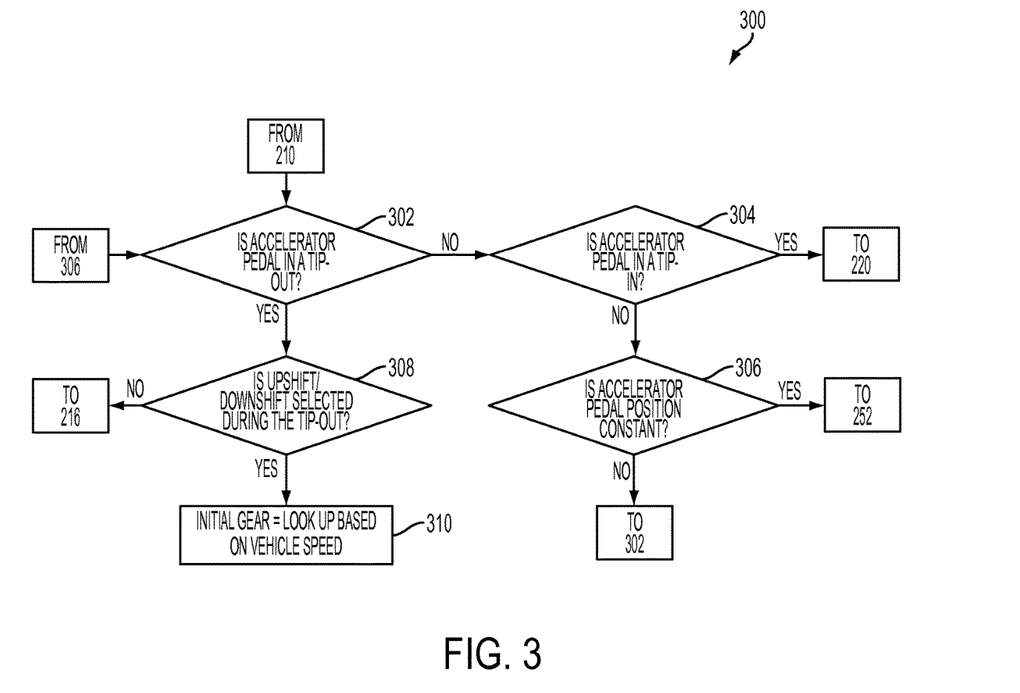

In some situations, the driver may depress the downshift or upshift selector while presently changing the accelerator pedal position, i.e. during an accelerator pedal tip-in or tip-out. FIG. 3 depicts operation of a system or method 300 that may be used to control vehicle operation when transitioning into a select shift mode under these conditions. While controlling the vehicle in SST mode, step 210, the controller may receive a signal indicating an accelerator pedal tip-out, step 302. If the accelerator pedal position is decreasing when a downshift or upshift request is received, step 308, the controller may then output a final virtual gear using a look-up table based on vehicle speed, step 310.

However, if during an accelerator pedal tip-out, while in SST mode and the driver does not select either a downshift or upshift in step 308, the controller then returns to step 216. As stated previously, in step 216 if the change in accelerator pedal position is less than or equal to zero, the controller may then select an initial gear based on vehicle speed, step 218.

Referring back to step 302, if the controller does not receive a signal indicating an accelerator pedal tip-out, but instead receives a signal indicating an accelerator pedal tip-in, step 304, the controller returns to step 220. At step 220, the controller may determine the initial virtual gear based on accelerator pedal percentage. However, if in step 304, the signal does not indicate an accelerator pedal tip-in, but instead indicates a constant accelerator pedal position, step 306, the controller returns to step 252. At step 252, based on whether a downshift or upshift was selected by the driver, the controller selects a final virtual gear. If in step 306, the signal does not indicate a constant accelerator pedal position, the controller returns to step 302 and determines if an accelerator pedal tip-out is occurring.

Figure 4:
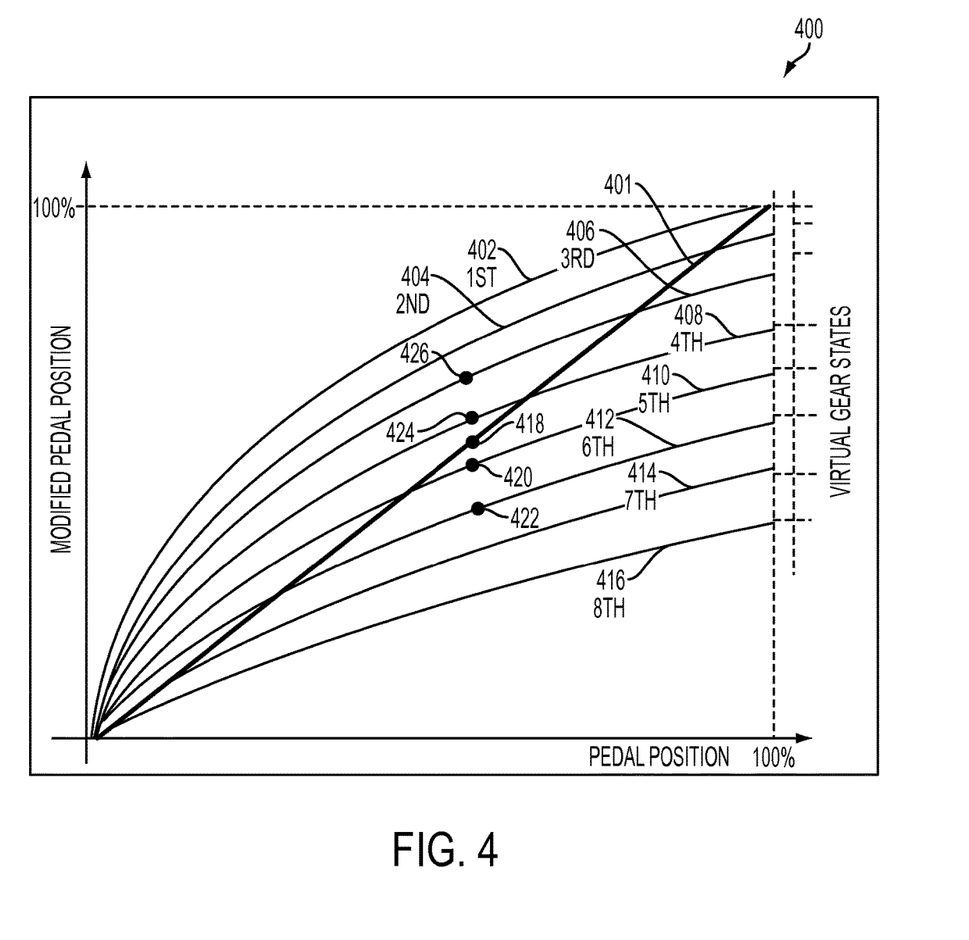
FIG. 4 illustrates a relationship between pedal position, virtual gear and modified pedal position.

FIG. 4 illustrates a relationship between accelerator pedal position, virtual gear and modified accelerator pedal position. This modified accelerator pedal position may be used to calculate the target output torque. The curves in FIG. 4 are selectable virtual gears to simulate vehicle operation associated with a discrete ratio transmission. Specifically, as the virtual gear number (1st through 8th in this example) increases, the resulting target output torque is lowered for a given non-zero accelerator pedal position. The combined operation of the engine, the electric machine and at least one traction motor may correspond to a plurality of output torque functions. Each output torque function may have a distinct output torque at an accelerator pedal position for an associated vehicle speed.

Generally, when the vehicle is operated in CVT mode, the controller may vary the output torque according to pedal position along line 401. Line 401 illustrates a relationship between pedal position and output torque according to CVT logic. The current accelerator pedal position may correlate to a continuously-variable gear output torque or operating point along line 401. As the driver activates SST mode, the controller determines the initial virtual gear to place the vehicle in based on the current operating conditions corresponding to a point on line 401 and may determine the modified pedal position corresponding to the initial virtual gear. For example, if the driver actuates SST mode while the pedal position places the operation of the transmission at point 418 on line 401, the vehicle is between fourth virtual gear, 408 and fifth virtual gear, 410.

If the driver actuates an upshift while maintaining the current pedal position, the controller may select the fifth virtual gear 410 then modify or remap the pedal position to point 420. Mapping the pedal position to point 420 requires the controller to determine or calculate a modified pedal position corresponding to a decreased output torque. If the driver causes a negative change in pedal position and actuates an upshift, the controller may select the sixth virtual gear 412 then map the pedal position to point 422. Again, the controller may calculate a modified pedal position corresponding to a further decreased output torque.

Continuing with FIG. 4, if the driver actuates SST mode while the pedal position places the operation at point 418 along the continuously-variable line 401, the vehicle is between fourth virtual gear, 408 and fifth virtual gear, 410. The controller may then determine the appropriate virtual gear to output. If the driver actuates a downshift while maintaining the current pedal position, the controller may select the fourth virtual gear 408 then map the pedal position to point 424. Mapping the pedal position to point 424 requires the controller to calculate a modified pedal position corresponding to an increased output torque. If the driver causes a positive change in pedal position and actuates a downshift, the controller may select the third virtual gear state 406 then map the pedal position to point 426. Again, the controller may calculate a modified pedal position corresponding to a further increased output torque.

Alternatively, the controller may be configured to adjust the virtual gear selection and therefore the modified pedal position to provide the driver the expected feel of the shift change. For example, the driver may actuate a downshift while the pedal position places the vehicle operation at point 418 along the continuously-variable operating line 401. The controller may select the fourth virtual gear 408 and map the pedal position to point 424. If the change in pedal position from point 418 to point 424 is greater than a threshold change in pedal position to provide a noticeable change in output torque, the controller may output the fourth virtual gear 408 for display to the driver and operate the vehicle accordingly. However, if the change in pedal position from point 418 to point 424 is less than a threshold change in pedal position to provide a noticeable change in output torque based on the corresponding modified pedal position, the controller may select the third virtual gear 406 and map the pedal position to point 426. This adjustment in pedal position and/or virtual gear by the controller may increase the output torque to provide the driver the expected feel of a downshift and output for display to the driver, the third virtual gear 406.

A further example of the virtual gear adjustment includes a driver actuating an upshift while the pedal position places the vehicle operation at point 418 along the continuously-variable operating line 401. The controller may select the fifth virtual gear 410 and map the pedal position to point 420. If the change in pedal position from point 418 to 420 is greater than a threshold change in pedal position to provide a noticeable change in output torque, the controller outputs the fifth virtual gear 410 for display to the driver. However, if the change in pedal position from point 418 to point 420 is less than a threshold change in pedal position to provide a noticeable change in output torque based on the corresponding modified pedal position; the controller may select the sixth virtual gear 412 and map the pedal position to point 422. This adjustment in pedal position and/or virtual gear by the controller may decrease the output torque to provide the driver the expected feel of an upshift and output for display to the driver, the sixth virtual gear 412.

The controller may then perform a check to ensure that the change in pedal position or the actual pedal position does not exceed a check threshold. Should the change in pedal position or actual pedal position exceed the check threshold, the controller may re-map pedal position to permit operation at or below the check threshold. The re-mapping of pedal position may affect the engine speed and output torque and/or the traction motor speed and output torque.

As illustrated by the representative embodiments described above, various embodiments according to the present disclosure may provide one or more advantages, such as emulating a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain torque to provide enhanced luxury features and a sporty feel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method of operating a hybrid-electric vehicle having an engine, a traction battery, a traction motor, a generator and a continuously-variable transmission, comprising:
   receiving at least one of a user-initiated upshift request and downshift request and a select mode request to simulate to a user a feel of a step-ratio transmission;
   outputting for display a virtual gear selected in response to an accelerator pedal position and a current vehicle speed; and
   varying an output torque in response to the virtual gear selected and a modified accelerator pedal position and the at least one of a user-initiated upshift request and downshift request, by controlling relative speed between an engine speed, a traction motor speed and a generator speed, the modified accelerator pedal position retrieved from a look-up table accessed using the accelerator pedal position and the virtual gear selected.

2. The method of claim 1 wherein the modified accelerator pedal position corresponds to the virtual gear selected based on the accelerator pedal position and a continuously-variable gear operating point and the at least one of the user-initiated upshift request and downshift request.

3. The method of claim 1 wherein outputting for display the virtual gear selected further comprises selecting a virtual gear based on a current vehicle speed, in response to the at least one of a user-initiated upshift request and downshift request signal when a change in the accelerator pedal position indicates an accelerator pedal tip-out.

4. The method of claim 1 wherein the modified accelerator pedal position increases the output torque a first amount, in response to the user-initiated downshift request and a change in the accelerator pedal position more than a threshold.

5. The method of claim 4 wherein the modified accelerator pedal position increases the output torque a second amount, in response to the user-initiated downshift request and a change in the accelerator pedal position less than the threshold.

6. The method of claim 5 wherein the second amount is greater than the first amount.

7. The method of claim 1 wherein the modified accelerator pedal position decreases the output torque a first amount, in response to the user-initiated upshift request and a change in the accelerator pedal position more than a threshold.

8. The method of claim 7 wherein the modified accelerator pedal position decreases the output torque a second amount, in response to the user-initiated upshift request and a change in the accelerator pedal position less than the threshold.

9. The method of claim 8 wherein the second amount is greater than the first amount.

10. A method of operating a hybrid vehicle having an engine, an electric machine and a continuously variable transmission in a step-ratio transmission operating mode, comprising:
    increasing an output torque responsive to a downshift request and a modified accelerator pedal position retrieved from a lookup table using a virtual gear selection and a current accelerator pedal position; and
    operating at least one of the engine and the electric machine to satisfy the output torque.

11. The method of claim 10 further comprising outputting for display a first gear as the corresponding virtual gear selection when vehicle speed is less than a vehicle speed threshold.

12. The method of claim 10 further comprising:
    providing for display, one of a plurality of discrete virtual gears based at least on a vehicle speed if the current accelerator pedal position is less than a pedal position threshold.

13. The method of claim 10 further comprising adjusting the corresponding virtual gear selection in response to the current accelerator pedal position exceeding a threshold, wherein the adjusted corresponding virtual gear selection is lower than the corresponding virtual gear selection.

14. The method of claim 13 further comprising adjusting the output torque in response to the current accelerator pedal position exceeding a second threshold.

* * * * *